United States Patent
Maddick

[15] 3,670,231
[45] June 13, 1972

[54] APPARATUS FOR MONITORING FLOW OF CURRENT IN A CONDUCTOR

[72] Inventor: George Albert Farquhar Maddick, c/o The English Electric Company Limited, Stafford, England

[22] Filed: Feb. 8, 1971

[21] Appl. No.: 113,472

[30] Foreign Application Priority Data

Feb. 6, 1970  Great Britain..........................5,868/70

[52] U.S. Cl..............................321/12, 310/68 D, 336/120, 340/253 E
[51] Int. Cl........................H02m, G08b 21/00, H01f 21/06
[58] Field of Search..............321/12, 28; 340/253 B, 253 E, 340/253 P, 248 E, 248 F; 310/68 B, 68 D; 336/120

[56] References Cited

UNITED STATES PATENTS

| | | | |
|---|---|---|---|
| 3,493,839 | 2/1970 | De Puy | ..................321/12 |
| 3,474,436 | 10/1969 | Burton | ..............340/253 E |
| 2,057,531 | 10/1936 | Livingston | ..........340/253 P |

FOREIGN PATENTS OR APPLICATIONS 936,492  9/1963  Great Britain..........................321/12

Primary Examiner—William H. Beha, Jr.
Attorney—Misegades & Douglas

[57] ABSTRACT

Apparatus for monitoring the flow of recurring pulses of direct current in a conductor. The apparatus includes magnetic means coupled to the conductor for establishing a magnetic field in a known discrete path in response to the recurring pulses and sensing means for generating a signal when a magnetic field is established. The apparatus can be included in a rotatable rectifier system having a plurality of rectifier arms, a magnetic means being coupled to a conductor in each rectifier arm. The magnetic means are disposed in a circular arrangement so that they may generate a signal in a common stationary sensing means as they rotate and pass the sensing means.

7 Claims, 3 Drawing Figures

APPARATUS FOR MONITORING FLOW OF CURRENT IN A CONDUCTOR

This invention relates to apparatus for monitoring a conductor to establish whether or not current is flowing in the conductor.

The apparatus has been specifically developed to respond to rectified d.c. which comprises recurring pulses of current. This apparatus can be used with any rectifier network and is particularly suited for use with a rotating rectifier system. These systems are used for brushless d.c. generators such as are used for energizing the rotating field winding of an a.c. generator. These rotating rectifier systems include a fuse in each arm of the rectifier network, and it is necessary to know if a fuse has blown. Various forms of apparatus which do not require the use of slip rings have been proposed for detecting blown fuses but they are mainly responsive to actual blowing of the fuse, so that an open circuit in a rectifier arm which does not involve the blowing of a fuse is not detected.

According to the present invention there is provided apparatus for monitoring the flow of recurring pulses of direct current in a conductor including magnetic means coupled to the conductor for establishing a magnetic field in a known discrete path in response to the recurring pulses, and sensing means for generating a signal so long as the magnetic field is established.

The magnetic means comprises a winding of low retentivity magnetic material disposed about the conductor, the magnetic field being established across the ends of the winding.

The two ends of the winding are in the form of a pair of magnetic poles.

Preferably the winding comprises a single turn of the magnetic material, the ends of the single turn being displaced along the length of the conductor in overlapping relationship, and including an extension of the magnetic material attached to each end of the winding and projecting away from the conductor to form magnetic poles spaced from the conductor,.

Each magnetic pole may be surrounded by a short circuited winding which helps to maintain the magnetic field between consecutive ones of the recurring pulses.

The sensing means may comprise any device responsive to a magnetic field, preferably a pickup coil.

According to another aspect of the invention, a rotating rectifier system includes apparatus as described above in which magnetic means is coupled to each arm of the rectifier system, the magnetic means being disposed in a circular arrangement so that they may generate a signal in a common stationary sensing means as they are rotated past this latter means.

The rotating rectifier system may include means for generating a reference marker signal whereby each individual magnetic means and its associated conductor can be identified.

The rotating rectifier system may include means for generating reference marker signals indicative of each individual magnetic means.

This latter means may include a high frequency signal supplied to the pickup whereby the value of the high frequency current is changed as each magnetic means rotates past the pickup and changes its inductance.

In order that the invention may be better understood, one embodiment thereof for incorporation into a rotating rectifier system will now be described, by way of example, with reference to the accompanying drawings, in which.

Figure 1:
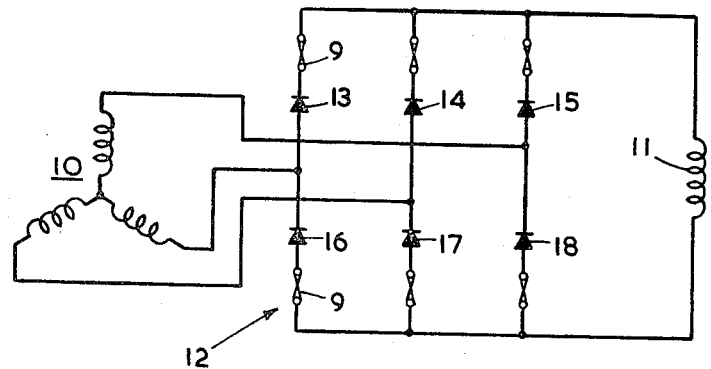
FIG. 1 shows the basic circuit of a three phase rotating rectifier system.

FIG. 1 shows the basic circuit of a rotating rectifier system as used for energizing the rotating direct current field winding of an alternating current generator. All the parts rotate and the reference 10 indicates the rotating armature of a three phase a.c. generator, the field winding of which is not shown. The output of the rotating armature 10 is rectified in a three phase network 12 and supplied to the rotating field winding 11 of a large a.c. generator. The rectifier network 12 has six arms 13 to 18, each of which includes a string of diodes, indicated by a single diode, and a main fuse as shown at 9 in arms 13 and 16.

Figure 3:
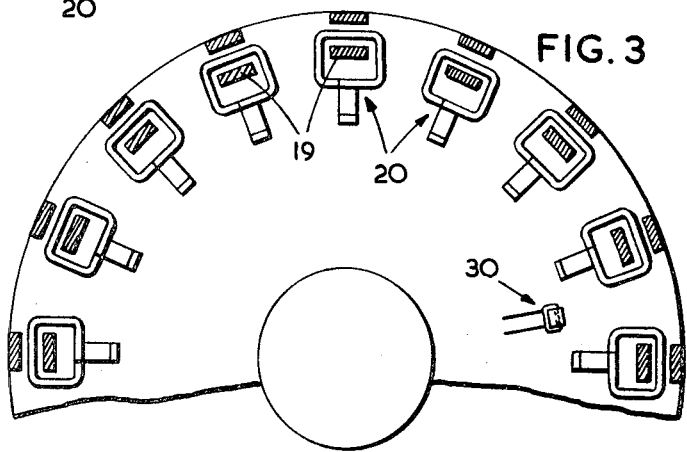
FIG. 3 shows one possible arrangement of the apparatus of FIG. 2.

The apparatus of FIG. 1 is mounted on a rotating shaft, or coupled shafts, so that any part of the conductors of each of the rectifier arms can form part of a preferably symmetrical axial arrangement of like conductor parts as shown in FIG. 3. Alternatively, the conductor parts could be arranged in a radial arrangement.

Figure 2:
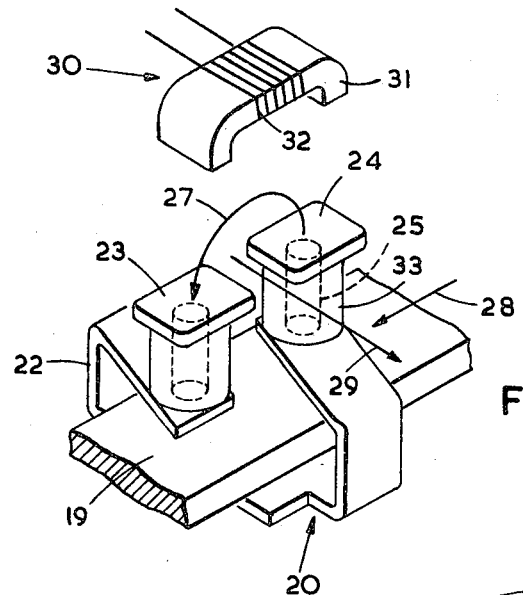
FIG. 2 shows apparatus in accordance with the invention for monitoring the flow of current in a conductor. This apparatus can be used in the circuit of FIG. 1.

FIG. 2 shows part of a conductor 19 of any of the rectifier arms and constitutes part of an axial arrangement of a plurality of like conductor parts. Disposed about the conductor 19 is a magnetic device 20 made of a low retentivity magnetic material such, for example, as soft iron. This device consists of a single turn winding 22 of the magnetic material, the ends of the turn overlapping so that they are spaced along the length of the conductor. If desired the winding 22 may have more than one turn. Each end of the single turn carries extensions of the magnetic material which form magnetic poles 23 and 24. The device 19 is securely mounted on the conductor and electrically insulated therefrom by means not shown. Each magnetic extension comprises a short rod 25 and a top plate 26 both of the magnetic material. Disposed about each of the cylinders 25 is a short circuited winding 33 which is preferably made of one heavy section turn of a good electrical conductor. This short circuited turn need not be used but improves operation of the apparatus.

Recurring pulses of direct current flow in the conductor 19 and a magnetic field will be established across the poles 23 and 24 by each d.c. pulse. The short circuited turns 33 will help to maintain the magnetic field substantially constant even though the current in the conductor falls to zero between pulses. The position and direction of the magnetic field between the poles 23 and 24 is indicated by the arrow 27 and the direction of current flow in the conductor 19 is indicated by the arrow 28.

The conductor 19 and the device 20 rotate to move in the general direction of the arrow 29 and the device 20 thus moves past a stationary pickup 30 having a magnetic core 31 and winding 32 although the core is optional. The pickup 30 is disposed reasonably close to the poles 23 and 24 so that it will respond to the passing device 20, that is, providing the conductor 19 is carrying the recurring pulses of d.c. If no pulses of d.c. are flowing in the conductor, no signal will be generated in the pickup.

As each conductor with its device 20 moves past the pickup, successive signals are generated and can be monitored. Thus an indication can be obtained as to whether or not any one or more of the conductors is conducting or is in a non conducting condition.

The above described apparatus will not only respond if one of the fuses 9 has blown, but will also indicate a mechanical failure such as a broken conductor or other broken connection. In fact, any open circuit condition which would not necessarily have caused blowing of a fuse will be detected.

Each of the conductors such as 19 will be surrounded by a magnetic field when it is operating normally but any attempt to detect the conductor fields directly would not be likely to give satisfactory results as the pickup device would tend to respond to adjacent conductor fields simultaneously. With the present apparatus each field, provided between the poles 23 and 24 is concentrated, spaced from the field around an adjacent conductor, and also can be well spaced from a similar field established by an adjacent conductor.

FIG. 3 shows part of a circular arrangement of sixteen axially extending conductors 19 with devices 20 and the pickup 30.

In order to help identify the individual rotating conductors a reference marker signal can be generated by any convenient means and this signal supplied to the monitoring apparatus. A simple rotating permanent magnet and co-operating pickup would provide a suitable reference marker signal.

In addition to the signal from the pickup 30 and the marker pickup signal, evaluation of information in the monitoring apparatus would be facilitated if a marker signal was also provide for each conductor whether or not it was carrying current. This could be achieved by energizing the pickup coil from a high frequency source so that as each magnetic device 20 passes the pickup the resultant change of inductance would modify the high frequency current from which a suitable pulse could be obtained. A suitable filter would be required for separating the high frequency signal from other signals. With this arrangement one pickup can supply information relating to more than one condition existing in the rotating rectifier network and a reference marker signal could also be generated by the high frequency method.

I claim:

1. Apparatus for monitoring the flow of recurring pulses of direct current in a rotatable rectifier system which has a plurality of rectifier arms interconnected by electrical conductors including, for each rectifier arm, a magnetic means coupled to a conductor in the associated rectifier arm for establishing a magnetic field in a known discrete path in response to the recurring pulses of direct current, the magnetic means being disposed in a circular arrangement, the apparatus including a common stationary sensing means which generates a signal in response to each discrete magnetic field established by the magnetic means.

2. Apparatus according to claim 1 including means for generating a reference marker signal whereby each individual magnetic means and its associated conductor can be identified.

3. Apparatus according to claim 1 including means for generating reference marker signals indicative of each individual magnetic means.

4. Apparatus according to claim 3 in which a high frequency signal is supplied to the stationary sensing means whereby the value of the current of the high frequency signal is changed as each magnetic means rotates past the sensing means and changes its inductance.

5. Apparatus according to claim 1 in which the magnetic means comprises a winding of low retentivity magnetic material disposed about the conductor, the magnetic field being established across the ends of the winding.

6. Apparatus according to claim 1 in which the winding comprises a single turn of the magnetic material, the ends of the signal turn being displaced along the length of the conductor in overlapping relationship, and including an extension of the magnetic material attached to each end of the winding and projecting away from the conductor to form magnetic poles spaced from the conductor.

7. Apparatus according to claim 6 in which each magnetic pole is surrounded by a short circuited winding which helps to maintain the magnetic field between consecutive ones of the recurring pulses.

* * * * *